United States Patent Office 3,718,744
Patented Feb. 27, 1973

3,718,744
PHARMACEUTICAL COMPOSITIONS COMPRISING AN α-AMINOALKYL - 4-HYDROXY - 3 -CARBOALKOXYAMINOBENZYL ALCOHOL
Carl Kaiser, Haddon Heights, N.J., and Stephen T. Ross, Berwyn, Pa., assignors to Smith Kline & French Laboratories, Philadelphia, Pa.
No Drawing. Continuation-in-part of application Ser. No. 34,893, May 5, 1970, now Patent No. 3,657,319, dated Apr. 18, 1972. This application Dec. 3, 1971, Ser. No. 204,718
Int. Cl. A61k 27/00
U.S. Cl. 424—300  10 Claims

ABSTRACT OF THE DISCLOSURE

Pharmaceutical compositions having β-adrenergic stimulant activity comprising an α-aminoalkyl-4-hydroxy-3-carboalkoxyaminobenzyl alcohol. The active ingredients are prepared from 3-amino-4-benzyloxyphenones by conversion to an isocyanate, reaction with a lower alkanol to give 3-carboalkoxyaminophenones, bromination of these phenones and treatment of the resulting α-bromo derivatives with an N-benzyl secondary amine, followed by catalytic hydrogenation to remove the benzyl groups and reduce the ketone moiety.

This application is a continuation-in-part of application Ser. No. 34,893, filed May 5, 1970, now U.S. 3,657,319.

This invention relates to novel pharmaceutical compositions comprising an α-aminoalkyl-4-hydroxy-3-carboalkoxyaminobenzyl alcohol. More specifically the compositions of this invention have β-adrenergic stimulant activity, with relatively greater activity on respiratory smooth muscle than on cardiac muscle. Therefore these compositions have direct bronchodilator activity with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The active medicaments of this invention have selective bronchodilating properties since they are active in (1) above at a dose lower than is required in (2) above resulting in a positive separation ratio.

The novel pharmaceutical compositions of this invention, in dosage unit form, comprise a nontoxic pharmaceutical carrier and an α-aminoalkyl-4-hydroxy-3-carboalkoxyaminobenzyl alcohol represented by the following general structural formula:

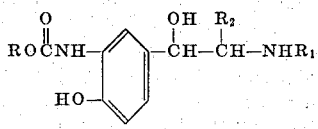

FORMULA I in which:
R represents lower alkyl of from 1 to 5 carbon atoms, straight or branched chain;

$R_1$ represents a branched chain lower alkyl group of from 3 to 5 carbon atoms, a cycloalkyl or cycloalkylmethyl group, the cycloalkyl moiety having from 3 to 6 carbon atoms,

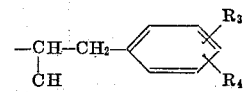

$R_2$ represents hydrogen, methyl or ethyl; and
$R_3$ and $R_4$ represent hydrogen, hydroxy or methoxy.
Preferred compounds are represented by Formula I above when R is ethyl; $R_1$ is isopropyl, t-butyl, cyclopropyl, cyclopentyl or 3,4-dimethoxyphenylisopropyl; and $R_2$ is hydrogen.

The active medicaments of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonid, ethanedisulfonic, acetic, oxalic, propionic, tartaric, salicylic, citric, glyconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

Further the compounds of Formula I contain at least one asymmetric carbon atom which is resolvable into d- and l-optical isomers. When $R_2$ in Formula I is not hydrogen another asymmetric carbon atom is formed and these compounds (diastereoisomers) are designated as erythro- and threo isomers which may be resolved as d, l optical isomers. Unless otherwise specified in the description and accompanying claims, it is intended to include all isomers, whether separated or mixtures thereof.

A preferred composition of this invention comprises α-(t-butylaminomethyl) - 3-carboethoxyamino-4-hydroxybenzyl alcohol which relaxes the spontaneous tone of guinea pig tracheal ring preparation at an $ED_{50}$ of 0.02 mcg./ml. while increasing the rate of contraction of guinea pig right atria at an $ED_{25}$ of 0.1 mcg./ml. These activities give an absolute separation ratio of 5 which is a 10-fold improvement when compared to the corresponding activity of d, l isoproterenol (absolute separation ratio=0.5) in similar in vitro preparations.

The compounds of Formula I are prepared as shown in the following sequence of reactions:

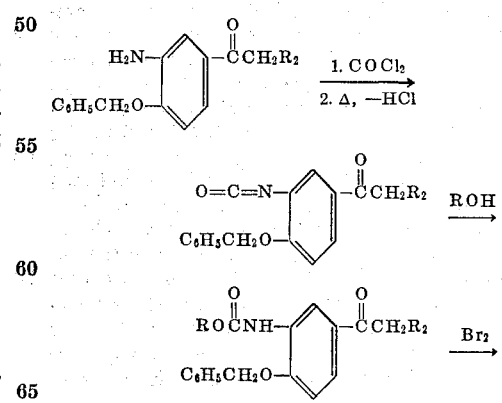

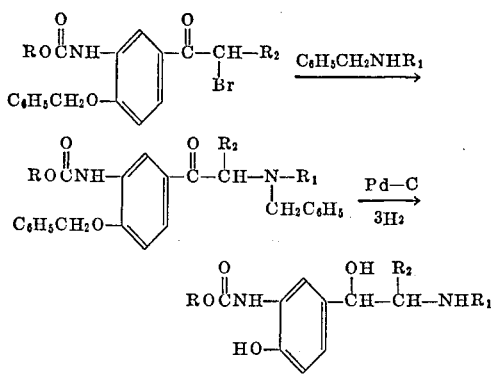

in which R, $R_1$ and $R_2$ are as defined in Formula I. Thus, as shown above, an aminobenzyloxyphenone is treated with phosgene and then heated to give the isocyanate which is reacted with a lower alkanol to yield the carboalkoxyaminophenone derivative. The latter is treated with bromine and the resultant α-bromophenone is reacted with an N-benzylamine to give the corresponding α-benzylaminophenone. This derivative is hydrogenated catalytically, preferably with palladium-on-carbon, to give the debenzylated carboalkoxyaminobenzyl alcohol product.

The aminobenzyloxyphenones used as starting materials herein are known and are prepared as follows: a 4-hydroxyphenone is nitrated with red fuming nitric acid at $-25°$ C. to yield the 4-hydroxy-3-nitrophenone which is reacted with benzyl chloride in the presence of potassium hydroxide to give the 4-benzyloxy-3-nitrophenone and the latter is reduced to the 3-amino-4-benzyloxyphenone using Raney nickel and hydrazine hydrate or platinum oxide and hydrogen.

The compounds of Formula I may be administered orally or parenterally in conventional dosage unit forms such as tablets, capsules, injectables or the like, by incorporating the appropriate dose of a compound of Formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 0.25 mg. to about 25 mg. Advantageously equal doses will be administered 3 to 4 times daily with the daily dosage regimen being about 0.75 mg. to about 100 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension. Of particular applicability for intranasal administration is an aerosol dispensing system wherein the active medicament is incorporated with Freon or other inert propellant in an aerosol container. Such an aerosol system will deliver a metered dose of about 100 mcg. to about 500 mcg., administered once or twice at a time as needed. Also useful for this purpose is a liquid formulation in a plastic squeeze bottle.

The pharmaceutical preparations are made following the conventional techniques of the pharmaceutical chemist involving mixing, granulating and compressing when necessary, or variously mixing and dissolving the ingredients as appropriate to the desired end product.

A representative tablet has the following composition:

| Ingredients: | Mg./tablet |
| --- | --- |
| α-(t - Butylaminomethyl) - 3 - carbomethoxyamino-4-hydroxybenzyl alcohol | [1] 5.0 |
| Lactose | 100 |
| Starch | 10 |
| Magnesium stearate | 1 |

[1] An equivalent of the hydrochloride salt is employed.

A representative aerosol formulation has the following composition:

| Ingredients: | Mg./dose |
| --- | --- |
| α-(t-Butylaminomethyl) - 3 - carbomethoxyamino - 4 - hydroxybenzyl alcohol hydrochloride | 0.125 |
| Alcohol, U.S.P. | 17 |
| Propellant (20% Freon 12/80% Freon 114 mixture) | 33 |

The following examples illustrate the preparation of active medicaments of this invention. Alternatives and modifications of the general procedures set forth herein will be apparent to those skilled in the art. These procedures make fully apparent all of the compounds embraced by the general formulas given above.

EXAMPLE 1

A stirred solution of 40 g. (0.41 m.) of phosgene in 150 ml. of toluene is held at 25° C. with a cooling bath while a mixture of 25.2 g. (0.105 m.) of 3-amino-4-benzyloxyacetophenone and 220 ml. of toluene are added slowly. The mixture is heated to reflux and continued for 30 minutes. Nitrogen is passed through the mixture and then concentrated in vacuo to give a crystalline isocyanate, M.P. 105–106° C.

A solution of the isocyanate (12.5 g.) in 170 ml. of ethanol is refluxed for two hours. The reaction mixture is concentrated and the residue is triturated with hexane to give the crystalline 4-benzyloxy - 3 - carboethoxyaminoacetophenone, M.P. 84–86° C.

To a stirred solution of 1.6 g. (0.005 m.) of 4-benzyloxy-3-carboethoxyaminoacetophenone in 20 ml. of chloroform and 0.2 g. of benzoyl peroxide is added 0.84 g. (5% excess) of bromine in 2 ml. of chloroform. The mixture is stirred at room temperature for about 45 minutes in the presence of a spotlight and the solution is concentrated in vacuo at 35–45° C. to give 4-benzyloxy-α-bromo-3-carboethoxyaminoacetophenone, M.P. 98–100° C. The latter (3.92 g., 0.01 m.) is dissolved in 30 ml. of acetonitrile and 3.3 g. (0.02 m.) of N-benzyl-N-t-butylamine is added. The mixture is stirred and refluxed for two hours, then it is cooled and diluted with ether. Crystalline N-benzyl-N-t-butylamine hydrobromide is filtered. The filtrate is acidified with etheral hydrogen chloride and ether is added to give 4-benzyloxy-α-(N-benzyl-N-t-butylamino)-3-carboethoxyaminoacetophenone hydrochloride, M.P. 138–143° C.

A mixture of 2.6 g. (0.005 m.) of 4-benzyloxy-α-(N-benzyl-N-t-butylamino) - 3 - carboethoxyaminoacetophenone hydrochloride, 0.5 g. of 10% palladium-on-carbon and 100 ml. of ethanol is hydrogenated on the Parr apparatus at room temperature, using an initial pressure of 60 p.s.i. of hydrogen. After about 30 minutes hydrogen uptake is completed. The reaction mixture is filtered and the filtrate is concentrated in vacuo. The residue is crystallized with ether-ethanol to give α-(t-butylaminomethyl) - 3 - carboethoxyamino-4-hydroxybenzyl alcohol hydrochloride, M.P. 218–219° C.

Similarly, refluxing a solution of the isocyanate in methanol and proceeding with the ensuing reactions as described above yields the corresponding 3-carbomethoxyamino derivatives and the final product α-(t-butylaminomethyl) - 3 - carbomethoxyamino - 4 - hydroxybenzyl alcohol hydrochloride, M.P. 215–216.5° C.

Refluxing a solution of the isocyanate in isopropanol and continuing as described above yields ultimately α-(t-butylaminomethyl) - 3 - carboisopropoxyamino) - 4-hydroxybenzyl alcohol hydrochloride, M.P. 199–200° C.

EXAMPLE 2

A solution of 2.4 g. (0.008 m.) of the isocyanate prepared in Example 1 in 50 ml. of methanol is refluxed for two hours and the reaction mixture is concentrated to give 4 - benzyloxy - 3-carbomethoxyaminoacetophenone, M.P. 104–106.5° C.

To a suspension of 1.5 g. of the above carbomethoxyaminoacetophenone in 20 ml. of chloroform and 0.2 g. of benzoyl peroxide is added 0.84 g. (about 5% excess) of bromine in 2 ml. of chloroform. The reaction mixture is stirred at room temperature for 45 minutes and then concentrated in vacuo at 40–50° C. to give 4-benzyloxy-α-bromo-3-carbomethoxyaminoacetophenone, M.P. 102–104° C.

A mixture of 1.8 g. of 4-benzyloxy-α-bromo-3-carbomethoxyamino-acetophenone, 1.5 g. of N-benzylisopropylamine and 20 ml. of acetonitrile is stirred and refluxed for two hours, then it is cooled and diluted with ether. The reaction mixture is filtered (N-benzylisopropylamine hydrobromide) and the filtrate acidified. The solid is filtered, dissolved in 100 ml. of ethanol, 1 g. of palladium-carbon is added and the mixture is hydrogenated on a Parr shaker (initial hydrogen pressure 60 p.s.i. and room temperature). The mixture is filtered, after hydrogen uptake is completed (about 45 minutes) and the filtrate is concentrated in vacuo. The residue is crystallized from ethanol-ether to give 3-carbomethoxyamino-4-hydroxy-α-(isopropylaminomethyl)-benzyl alcohol hydrochloride.

Similarly, employing n-butanol in the initial reaction with the isocyanate and proceeding in the above sequence of reactions yields the corresponding 3-carbobutoxyamino derivatives and the product 3-carbobutoxyamino-4-hydroxy-α-(isopropylaminomethyl)-benzyl alcohol.

Reacting isopropanol with the isocyanate and following through as above furnishes as the final product, 3-carboisopropoxyamino - 4 - hydroxy - α-(isopropylaminomethyl)-benzyl alcohol.

EXAMPLE 3

Following the procedures outlined in Example 1, 4-benzyloxy - α - bromo-3-carboethoxyaminoacetophenone is reacted with N-benzylcyclopentylamine to give 4-benzyloxy - α - (N - benzylcyclopentylamino)-3-carboethoxyaminoacetophenone hydrochloride. Similar hydrogenation over palladium-on-carbon gives 3-carboethoxyamino-α-(cyclopentylaminomethyl)-4-hydroxy alcohol.

Reacting 4 - benzyloxy-α-bromo-3-carboethoxyaminoacetophenone with N-benzyl - 3,4 - dimethoxyphenylisopropylamine followed by hydrogenation furnishes the product 3 - carboethoxyamino - α - [2 - (3,4-dimethoxyphenyl)-methylethylaminomethyl]-4-hydroxy alcohol.

Similarly, employing N-benzylcyclopropylmethylamine in the above reaction followed by hydrogenation there is obtained 3 - carboethoxyamino - α-(cyclopropylmethylaminomethyl)-4-hydroxybenzyl alcohol.

EXAMPLE 4

Following the procedures of Example 2, 4-benzyloxy-α-bromo-3-carbomethoxyaminoacetophenone is reacted with N-benzylphenylisopropylamine to give 4-benzyloxy- - (benzylphenylisopropylamino)-3-carbomethoxyaminoacetophenone which is hydrogenated to yield 3-carbomethoxyamino - 4 - hydroxy - α - (2-phenyl - 1 - methylethylaminomethyl)-benzyl alcohol.

Similarly, reaction of the 4-benzyloxy-α-bromo-acetophenone with 3,4-dibenzyloxyphenylisopropyl amine yields as the final product 3-carbomethoxyamino-α-[2-(3,4 - dihydroxyphenyl) - 1-methylethylaminomethyl]-4-hydroxy benzyl alcohol.

EXAMPLE 5

A solution of 40 g. of phosgene in 150 ml. of toluene at 25° C. is treated with 28.1 g. of 3-amino-4-benzyloxybutyrophenone in 250 ml. of toluene. The mixture is refluxed for 30 minutes and concentrated in vacuo to give the isocyanate. The latter (31.2 g.) is dissolved in 500 ml. of ethanol and the solution is refluxed for two hours to yield 4-benzyloxy-3-carboethoxyaminobutyrophenone.

To a stirred solution of 6.4 g. of the above prepared 3-carboethoxyaminobutyrophenone in 125 ml. of chloroform is added 3.2 g. of bromine. After stirring at room temperature for about 45 minutes the reaction mixture is concentrated in vacuo at 25–30° C. The 4-benzyloxy-α-bromo-3-carboethoxyaminobutyrophenone thus obtained is dissolved in 100 ml. of acetonitrile and 9.8 g. of N-benzyl-N-t-butylamine is added. The mixture is refluxed for two hours, cooled and filtered. The filtrate is acidified with ethereal hydrogen chloride to give 4-benzyloxy-α-(N - benzyl - N - t - butylamino)-3-carboethoxyaminobutyrophenone hydrochloride.

A solution of 11.7 g. of the above prepared hydrochloride in 125 ml. of methanol and 25 ml. of water is added to a suspension of 1.5 g. of 10% palladium-on-carbon in 10 ml. of water. The mixture is hydrogenated on the Parr apparatus at room temperature to yield α-(1-t-butylaminopropyl)-3-carboethoxyamino - 4 - hydroxybenzyl alcohol hydrochloride.

Similarly, by employing 3-amino-4-benzyloxypropiophenone in the initial reaction with phosgene and following through the above sequence of reactions there is obtained the corresponding product, α-(1-t-butylaminoethyl)-3-carboethoxyamino-4-hydroxybenzyl alcohol hydrochloride.

EXAMPLE 6

Employing the procedures of Example 2, 4-benzyloxy-α - bromo-3-carbomethoxyaminoacetophenone is reacted with N-benzyl-4-benzyloxyphenylisopropyl amine to give 4-benzyloxy-α-(N-benzyl - 4 - benzyloxyphenylisopropylamino)-3-carbomethoxyaminoacetophenone which is hydrogenated to yield 3-carbomethoxyamino-4-hydroxy-α-[2-(4-hydroxyphenyl) - 1 - methylethylaminomethyl]-4-hydroxybenzyl alcohol.

What is claimed is:

1. A pharmaceutical composition having β-adrenergic stimulant activity, in dosage unit form, comprising a pharmaceutical carrier and an effective amount of a chemical compound of the formula:

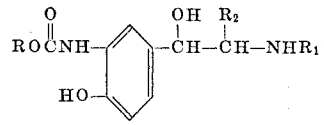

or a pharmaceutically acceptable acid addition salt of said compound, wherein:

R is straight or branched chain lower alkyl of from 1 to 5 carbon atoms;

R₁ is branched chain lower alkyl of from 3 to 5 carbon atoms, cycloalkyl or cycloalkylmethyl, the cycloalkyl moiety having from 3 to 6 carbon atoms, or

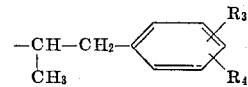

R₂ is hydrogen, methyl or ethyl; and
R₃ and R₄ are hydrogen, hydroxy or methoxy.

2. A pharmaceutical composition according to claim 1 in which R is ethyl.

3. A pharmaceutical composition according to claim 2 in which $R_2$ is hydrogen.

4. A pharmaceutical composition according to claim 3 in which $R_1$ is t-butyl, the active medicament being α-(t-butylaminomethyl) - 3 - carboethoxyamino - 4 - hydroxybenzyl alcohol.

5. A pharmaceutical composition according to claim 3 in which $R_1$ is cyclopentyl, the active medicament being 3 - carboethoxyamino - α - (cyclopentylaminomethyl)-4-hydroxybenzyl alcohol.

6. A pharmaceutical composition according to claim 1 in which R is methyl and $R_2$ is hydrogen.

7. A pharmaceutical composition according to claim 6 in which $R_1$ is t-butyl, the active medicament being α-(t-butylaminomethyl) - 3 - carbomethoxyamino-4-hydroxybenzyl alcohol.

8. A pharmaceutical composition according to claim 2 in which $R_2$ is methyl or ethyl.

9. A pharmaceutical composition according to claim 8 in which $R_2$ is ethyl and $R_1$ is t-butyl, the active medicament being α-(1-t-butylaminopropyl) - 3 - carboethoxyamino-4-hydroxybenzyl alcohol.

10. A pharmaceutical composition according to claim 8 in which $R_2$ is methyl and $R_1$ is t-butyl, the active medicament being α - (1-t-butylaminoethyl)-3-carboethoxyamino-4-hydroxybenzyl alcohol.

No references cited.

STANLEY J. FRIEDMAN, Primary Examiner